United States Patent
Kuwano et al.

(10) Patent No.: US 11,612,851 B2
(45) Date of Patent: Mar. 28, 2023

(54) CARBON DIOXIDE RECOVERY SYSTEM AND CARBON DIOXIDE RECOVERY METHOD

(71) Applicant: THE KANSAI ELECTRIC POWER CO., INC., Osaka (JP)

(72) Inventors: Satoshi Kuwano, Osaka (JP); Takaaki Seno, Osaka (JP); Kojiro Yamano, Osaka (JP); Atsushi Katsuma, Osaka (JP)

(73) Assignee: THE KANSAI ELECTRIC POWER CO., INC., Osaka (JP)

( * ) Notice: Subject to any disclaimer, the term of this patent is extended or adjusted under 35 U.S.C. 154(b) by 491 days.

(21) Appl. No.: 16/484,663

(22) PCT Filed: Dec. 1, 2017

(86) PCT No.: PCT/JP2017/043243
§ 371 (c)(1),
(2) Date: Aug. 8, 2019

(87) PCT Pub. No.: WO2018/189947
PCT Pub. Date: Oct. 18, 2018

(65) Prior Publication Data
US 2020/0054989 A1 Feb. 20, 2020

(30) Foreign Application Priority Data
Apr. 13, 2017 (JP) .............................. JP2017-079920

(51) Int. Cl.
*B01D 53/14* (2006.01)
*B01D 53/62* (2006.01)
(Continued)

(52) U.S. Cl.
CPC ............ *B01D 53/14* (2013.01); *B01D 53/62* (2013.01); *B01D 53/501* (2013.01); *B01D 53/78* (2013.01); *B01D 2257/80* (2013.01); *F01K 17/02* (2013.01)

(58) Field of Classification Search
CPC ...... B01D 53/14; B01D 53/62; B01D 53/501; B01D 53/78; B01D 2257/80; F01K 17/02
(Continued)

(56) References Cited

U.S. PATENT DOCUMENTS

2012/0318141 A1* 12/2012 Tsujiuchi ................ F23L 15/04
96/242
2013/0327025 A1 12/2013 Shimamura et al.
(Continued)

FOREIGN PATENT DOCUMENTS

JP 2012-250142 12/2012
JP 2015-530917 10/2015
(Continued)

OTHER PUBLICATIONS

International Search Report (ISR) dated Feb. 20, 2018 in International (PCT) Application No. PCT/JP2017/043243.

*Primary Examiner* — Anita Nassiri-Motlagh
(74) *Attorney, Agent, or Firm* — Wenderoth, Lind & Ponack, L.L.P.

(57) ABSTRACT

A carbon dioxide recovery system includes: a heat exchanger that is disposed between a boiler and a desulfurization device, configured to cool exhaust gas flowing from the boiler to the desulfurization device, and configured to heat a heat medium; and a carbon dioxide recovery device that is configured to, when supplied with heat of the heat medium, separate and recover carbon dioxide from an absorber which has absorbed the carbon dioxide.

12 Claims, 7 Drawing Sheets

(51) Int. Cl.
  *B01D 53/78*   (2006.01)
  *F01K 17/02*   (2006.01)
  *B01D 53/50*   (2006.01)
(58) Field of Classification Search
  USPC ........................................................ 423/228
  See application file for complete search history.

(56)            References Cited

U.S. PATENT DOCUMENTS

2014/0041523  A1    2/2014  Tsujiuchi et al.
2014/0105809  A1    4/2014  Okumura et al.

FOREIGN PATENT DOCUMENTS

WO       2012/164856      12/2012
WO       2012/176430      12/2012
WO       2014/018046       1/2014
WO       2014/024791       2/2014

\* cited by examiner

CARBON DIOXIDE RECOVERY SYSTEM AND CARBON DIOXIDE RECOVERY METHOD

TECHNICAL FIELD

The present invention relates to a carbon dioxide recovery system and a carbon dioxide recovery method that separate and recover carbon dioxide from an absorber having absorbed the carbon dioxide.

BACKGROUND ART

Conventionally, a carbon dioxide recovery system that separates and recovers carbon dioxide from an absorber having absorbed the carbon dioxide has been known. For example, Japanese Unexamined Patent Application Publication No. 2012-250142 thereinafter, "JP 2012-250142") discloses a configuration in which steam discharged from the exit of a steam turbine is compressed to increase temperature at a compressor, and then supplied to an adsorbent-filled tank for carbon dioxide desorption.

SUMMARY OF INVENTION

Technical Problem

However, with the above-described conventional configuration, since steam for carbon dioxide desorption needs to be compressed to increase temperature at the compressor, energy for driving the compressor is needed, which is a problem.

An object of the present invention, which has been made to solve the above-described problem, is to provide a carbon dioxide recovery system and a carbon dioxide recovery method that can achieve energy saving.

Solution to Problem

In order to achieve the above-described object, a carbon dioxide recovery system according to one aspect of the present invention includes: a first heat exchanger that is disposed between a boiler and a desulfurization device, cools exhaust gas flowing from the boiler to the desulfurization device, and heats a first heat medium; and a carbon dioxide recovery device that, when supplied with heat of the first heat medium, separates and recovers carbon dioxide from an absorber having absorbed the carbon dioxide.

Advantageous Effects of Invention

A carbon dioxide recovery system and the like according to the present invention can achieve energy saving.

DESCRIPTION OF EMBODIMENTS

Figure 1:
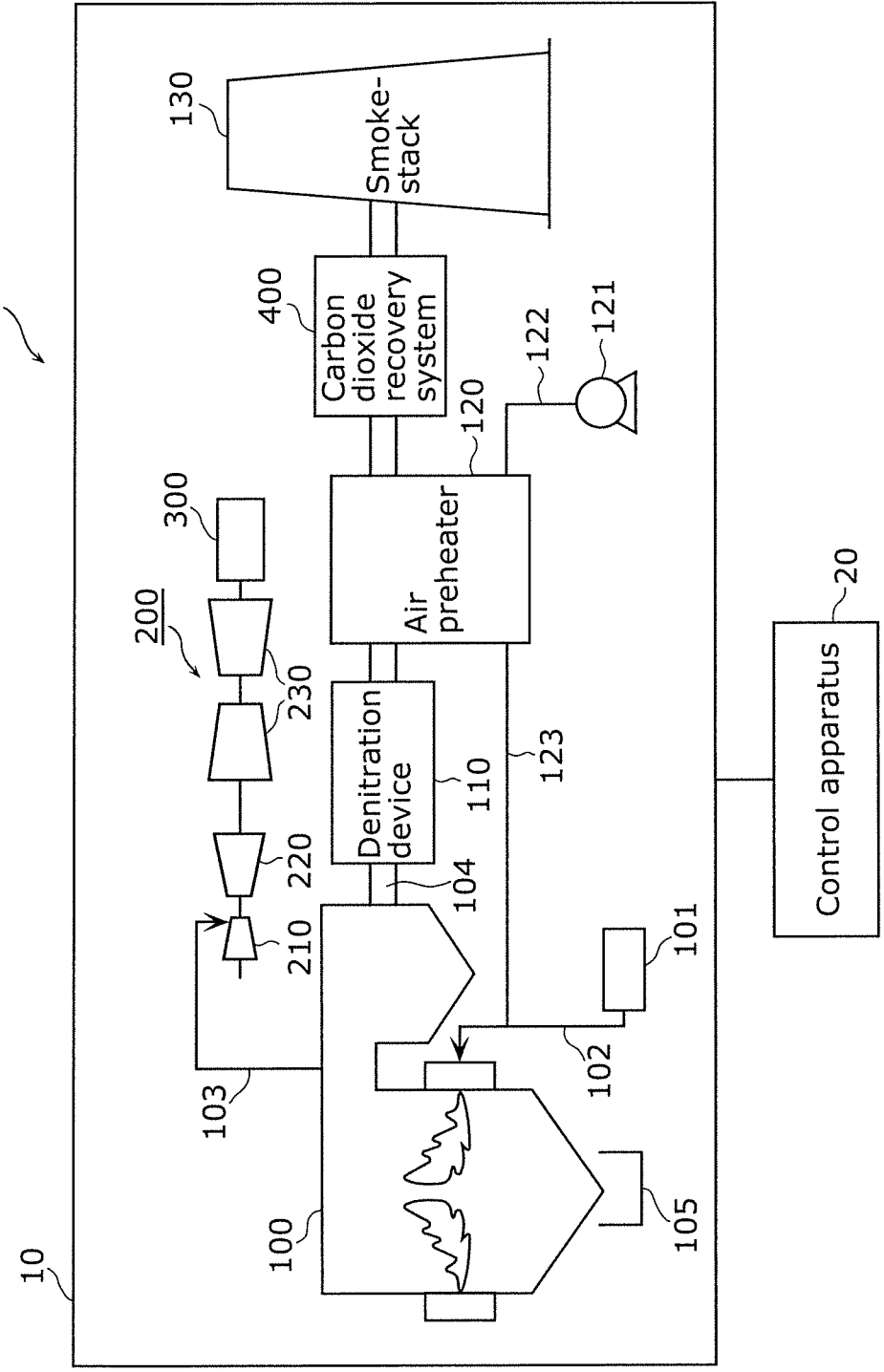
FIG. 1 is a pattern diagram illustrating a simplified configuration of a thermal power plant according to an embodiment of the present invention.

In order to achieve the above-described object, a carbon dioxide recovery system according to one aspect of the present invention includes: a first heat exchanger that is disposed between a boiler and a desulfurization device, cools exhaust gas flowing from the boiler to the desulfurization device, and heats a first heat medium; and a carbon dioxide recovery device that, when supplied with heat of the first heat medium, separates and recovers carbon dioxide from an absorber having absorbed the carbon dioxide.

With this configuration, the carbon dioxide recovery system includes the first heat exchanger that cools exhaust gas and heats the first heat medium between the boiler and the desulfurization device, and the carbon dioxide recovery device that separates and recovers the carbon dioxide from the absorber when supplied with heat of the first heat medium. In other words, heat of the first heat medium having exchanged heat with the exhaust gas between the boiler and the desulfurization device is supplied to the carbon dioxide recovery device, and the carbon dioxide is separated and recovered from the absorber. Any unnecessary material of the exhaust gas after leaving the boiler is removed by the desulfurization device and any other device before the desulfurization device, and thus the exhaust gas needs to be cooled to decrease the temperature of the exhaust gas so that the performance of these devices is maintained. Thus, heat of the first heat medium heated when the exhaust gas is cooled can be used to separate and recover the carbon dioxide, which leads to effective use of energy, thereby achieving energy saving.

In addition, the first heat exchanger may be disposed between the boiler and a dust collection device, cool exhaust gas flowing from the boiler to the dust collection device, and heat the first heat medium.

With this configuration, since the first heat exchanger is disposed between the dust collection device and the desulfurization device in the carbon dioxide recovery system, heat of the first heat medium having exchanged heat with the exhaust gas between the dust collection device and the desulfurization device is supplied to the carbon dioxide recovery device, and the carbon dioxide is separated and recovered from the absorber. When the exhaust gas after leaving the boiler is supplied to the desulfurization device, the exhaust gas needs to be cooled to decrease the temperature of the exhaust gas so that the performance of the desulfurization device is maintained. Thus, heat of the first heat medium heated when the exhaust gas is cooled can be used to separate and recover the carbon dioxide, which leads to effective use of energy, thereby achieving energy saving.

In addition, the first heat exchanger may be disposed between the boiler and a dust collection device, cools exhaust gas flowing from the boiler to the dust collection device, and heats the first heat medium.

With this configuration, since the first heat exchanger is disposed between the boiler and the dust collection device in the carbon dioxide recovery system, heat of the first heat medium having exchanged heat with the exhaust gas between the boiler and the dust collection device is supplied to the carbon dioxide recovery device, and the carbon dioxide is separated and recovered from the absorber. When the high-temperature exhaust gas after leaving the boiler is supplied to the dust collection device, the exhaust gas needs to be cooled to decrease the temperature of the exhaust gas to an appropriate temperature so that the performance of the dust collection device is maintained. Thus, heat of the first heat medium heated when the exhaust gas is cooled can be used to separate and recover the carbon dioxide, which leads to effective use of energy, thereby achieving energy saving.

In addition, the carbon dioxide recovery system may further include: a second heat exchanger that is disposed between the desulfurization device and a smokestack, heats exhaust gas flowing from the desulfurization device to the smokestack, and cools the first heat medium; and a heat medium circulation line including a first line connecting an exit of the first heat exchanger for the first heat medium and an entrance of the second heat exchanger for the first heat medium, and a second line connecting an exit of the second heat exchanger for the first heat medium and an entrance of the first heat exchanger for the first heat medium, and the carbon dioxide recovery device may separate and recover the carbon dioxide from the absorber when supplied with heat of the first heat medium flowing through the first line.

With this configuration, the carbon dioxide recovery system includes the second heat exchanger that heats exhaust gas and cools the first heat medium between the desulfurization device and the smokestack, and the heat medium circulation line for circulation through the first heat exchanger and the second heat exchanger. The carbon dioxide recovery device separates and recovers carbon dioxide from the absorber when supplied with heat of the first heat medium flowing through the first line connecting the exit of the first heat exchanger and the entrance of the second heat exchanger. Accordingly, heat of the first heat medium flowing through the first line can be used to separate and recover the carbon dioxide, which leads to effective use of energy, thereby achieving energy saving.

In addition, the carbon dioxide recovery device may be connected with a third line bifurcated from the first line and separate and recover the carbon dioxide from the absorber when supplied with the first heat medium from the first line.

With this configuration, in the carbon dioxide recovery system, the carbon dioxide recovery device separates and recovers carbon dioxide from the absorber when supplied with the first heat medium from the first line. Accordingly, the first heat medium flowing through the first line can be used to separate and recover the carbon dioxide, which leads to effective use of energy, thereby achieving energy saving.

In addition, the carbon dioxide recovery system may further include a third heat exchanger that cools the first heat medium heated by the first heat exchanger and heats a second heat medium, and the carbon dioxide recovery device may separate and recover the carbon dioxide from the absorber when supplied with heat of the second heat medium.

With this configuration, in the carbon dioxide recovery system, the carbon dioxide recovery device separates and recovers carbon dioxide from the absorber when supplied with heat of the second heat medium heated through heat exchange with the first heat medium. Accordingly, heat of the first heat medium can be used to separate and recover carbon dioxide through the second heat medium, which leads to effective use of energy, thereby achieving energy saving.

In addition, the carbon dioxide recovery system may further include a compressor coaxial with a turbine, and the carbon dioxide recovery device may separate and recover the carbon dioxide from the absorber when supplied with heat of steam discharged from the turbine and compressed by the compressor.

With this configuration, in the carbon dioxide recovery system, the carbon dioxide recovery device separates and recovers carbon dioxide from the absorber when supplied with heat of steam discharged from the turbine and compressed by the compressor coaxial with the turbine. Since steam discharged from the turbine is compressed by the compressor coaxial with the turbine, the steam can be transferred to the carbon dioxide recovery device. Accordingly, the steam discharged from the turbine is used for a heat medium, which leads to effective use of heat of the steam. In addition, the compressor, which is coaxial with the turbine, can be driven by the power of the turbine, and thus does not need power dedicated for driving the compressor. Moreover, the compressor needs to be able to increase the pressure of steam but does not need to be able to increase the temperature of the steam, and thus may be a small-sized compressor having power smaller than that of the compressor disclosed in JP 2012-250142. In this manner, in the carbon dioxide recovery system, heat of steam discharged from the turbine is effectively used, and the compressor has reduced power and is driven by the power of the turbine, thereby achieving energy saving.

In addition, when supplied with the exhaust gas, the carbon dioxide recovery device may separate and recover the carbon dioxide from the absorber through supply of heat of the first heat medium to the absorber having absorbed the carbon dioxide in the exhaust gas.

With this configuration, in the carbon dioxide recovery system, the carbon dioxide recovery device separates and recovers carbon dioxide from the absorber through supply of heat of the first heat medium to the absorber having absorbed the carbon dioxide in the exhaust gas after leaving the boiler. Accordingly, it is possible to recover carbon dioxide in exhaust gas while achieving energy saving.

In addition, the carbon dioxide recovery system may further include a control apparatus that adjusts a first temperature as a temperature of the exhaust gas at an exit of the first heat exchanger for the exhaust gas to a temperature in a first predetermined range and adjusts a second temperature as a temperature of heat supplied to the carbon dioxide recovery device to a temperature in a second predetermined range.

With this configuration, in the carbon dioxide recovery system, the control apparatus adjusts each of the temperature of exhaust gas on the exit side of the first heat exchanger and the temperature of heat supplied to the carbon dioxide recovery device to a temperature in a desired range. Thus, it is possible to maintain the performance of a device for removing any unnecessary material in exhaust gas by adjusting the temperature of the exhaust gas at the exit of the first heat exchanger to a temperature in the desired range. In addition, it is possible to efficiently recover carbon dioxide by adjusting the temperature of heat supplied to the carbon dioxide recovery device to a temperature in the desired range. Accordingly, it is possible to efficiently remove and recover any unnecessary material and carbon dioxide in exhaust gas while achieving energy saving.

It should be noted that the present invention can be implemented not only as the carbon dioxide recovery system as described above, but also as a carbon dioxide recovery method including characteristic processing steps performed by the carbon dioxide recovery system. In addition, the present invention can be implemented as a control apparatus included by the carbon dioxide recovery system. Furthermore, the present invention can be implemented as a control method performed by the control apparatus, or as an integrated circuit which includes characteristic processing units included in the control apparatus. In addition, the present invention can be implemented as a program for causing a computer to execute characteristic processes included in the control method, or as a computer readable recording medium such as a compact disc read only memory (CD-ROM) on which the program is recorded. It should be understood that the above-described program can be distributed via a recording medium such as a CD-ROM or a transmission medium such as the Internet.

The following describes a carbon dioxide recovery system and a carbon dioxide recovery method according to an embodiment and variations thereof of the present invention, with reference to the drawings. Each of the embodiment and the variations thereof described below shows a general or specific example. The numerical values, shapes, materials, structural components, the arrangement and connection of the structural components, steps in a method, the processing order of the steps etc. shown in the following embodiment and the variations thereof are mere examples, and therefore do not intend to limit the present invention. In addition, among the structural components in the following embodiment and the variations thereof, structural components not recited in any one of the independent claims are described as arbitrary structural components.

Embodiment

First description will be made as to a simplified configuration of a thermal power plant 1 including a carbon dioxide recovery system. FIG. 1 is a pattern diagram illustrating the simplified configuration of the thermal power plant 1 according to an embodiment of the present invention.

The thermal power plant 1 is a power generation system that generates steam by combusting fuel at a boiler and generates power at a steam turbine, and also treats, at a flue-gas treatment system, exhaust gas generated at the boiler and discharges the exhaust gas from a smokestack.

Specifically, as illustrated in the diagram, the thermal power plant 1 includes a power generation unit 10 including a flue-gas treatment system including a boiler 100, a steam turbine 200, an electric generator 300, and a carbon dioxide recovery system 400, and a control apparatus 20 that controls the devices included in the power generation unit 10. In the flue-gas treatment system, a denitration device 110 and an air preheater 120 are provided between the boiler 100 and the carbon dioxide recovery system 400, and a smokestack 130 is provided on an exit side of the carbon dioxide recovery system 400.

The boiler 100 is a combustion device (boiler) that combusts fuel and is, for example, a constant-pressure once-through boiler in the present embodiment. The boiler 100 includes a fuel supply device 101 that supplies fuel to the boiler 100. In the present embodiment, the fuel supply device 101 stores fossil fuel, specifically, coal as fuel supplied to the boiler 100, and supplies the coal to the boiler 100.

The fuel supply device 101 includes a storage facility (not illustrated) for storing coal, pulverizes the coal stored in the storage facility into pulverized coal, and supplies the pulverized coal to the boiler 100 through a pulverized-coal conveyance path 102. Then, the boiler 100 combusts the coal (pulverized coal) supplied from the fuel supply device 101.

The boiler 100 includes a main steam pipe 103, and transfers steam (main steam) generated by combusting fuel to the steam turbine 200 through the main steam pipe 103. The boiler 100 is connected with a flue 104, and exhaust gas after fuel combustion is transferred through the flue 104 to the denitration device 110, the air preheater 120, the carbon dioxide recovery system 400, and the smokestack 130. A bottom ash treatment facility 105 is provided at a bottom part of the boiler 100 and treats ash (coal ash) generated through fuel combustion at the boiler 100.

The steam turbine 200 is rotated by the energy of steam generated at the boiler 100. In the present embodiment, the steam turbine 200 includes a high-pressure turbine 210, an intermediate-pressure turbine 220, and a low-pressure turbine 230.

The high-pressure turbine 210 is rotated by high-pressure steam, the intermediate-pressure turbine 220 is rotated by intermediate-pressure steam having a pressure lower than that of the high-pressure steam, and the low-pressure turbine 230 is rotated by low-pressure steam having a pressure lower than that of the intermediate-pressure steam. In the present embodiment, the low-pressure turbine 230, the intermediate-pressure turbine 220, and the high-pressure turbine 210 are coaxially disposed in stated order from a side closer to the electric generator 300.

With this configuration, high-temperature and high-pressure steam (main steam) generated at the boiler 100 is transferred to the high-pressure turbine 210 through the main steam pipe 103 and rotates the high-pressure turbine 210. After leaving the high-pressure turbine 210, the steam is transferred to the intermediate-pressure turbine 220 and rotates the intermediate-pressure turbine 220. After leaving the intermediate-pressure turbine 220, the steam is transferred to the low-pressure turbine 230 and rotates the low-pressure turbine 230.

The steam turbine 200 may have a configuration in which any of the high-pressure turbine 210, the intermediate-pressure turbine 220, and the low-pressure turbine 230 is not included. Alternatively, the steam turbine 200 may include a turbine other than the above-described turbine.

The electric generator 300 is a turbine electric generator that generates electric power by converting the rotational force of the steam turbine 200 into electrical power. Specifically, the electric generator 300 is coaxial with the steam turbine 200 and disposed on a side of the low-pressure turbine 230 (side opposite to the intermediate-pressure turbine 220), and generates electric power by converting the rotational force of each of the high-pressure turbine 210, the intermediate-pressure turbine 220, and the low-pressure turbine 230 into electrical power.

The denitration device 110 denitrates exhaust gas generated by combusting fuel at the boiler 100. Specifically, the denitration device 110 is disposed between the boiler 100 and the air preheater 120. Accordingly, the denitration device 110 is disposed at the flue 104 on an entrance side of the air preheater 120, and removes nitrogen oxide in exhaust gas moving in the flue 104 toward the air preheater 120.

The air preheater 120 is a device that preheats air with exhaust gas, in other words, a device that heats combustion air before being fed to the boiler 100 to increase heat efficiency of the boiler 100. Thus, the air preheater 120 is disposed between the denitration device 110 and the carbon dioxide recovery system 400, heats air transferred to the boiler 100, and cools exhaust gas transferred to the carbon dioxide recovery system 400.

Specifically, the air preheater 120 is connected with a forced draft fan (FDF) 121, and receives air fed through an air entrance duct 122 by drive of the forced draft fan 121. Then, the air preheater 120 feeds the air as high-temperature air to an air exit duct 123 through heat exchange with exhaust gas in the flue 104 after leaving the denitration device 110. Then, the high-temperature air is transferred to the boiler 100 through the air exit duct 123, and used as air for pulverized coal combustion. Accordingly, the exhaust gas to be transferred to the carbon dioxide recovery system 400 is cooled.

The air preheater 120 includes a heat transfer body (element) disposed inside and performs heat exchange between air and exhaust gas, but may have any configuration with which heat exchange between air and exhaust gas can be performed.

The carbon dioxide recovery system 400 recovers carbon dioxide in exhaust gas flowing from the boiler 100 to the smokestack 130, and is disposed between the air preheater 120 and the smokestack 130. The carbon dioxide recovery system 400 recovers carbon dioxide in exhaust gas by using heat of the exhaust gas having flowed from the boiler 100 through the flue 104 and been cooled at the air preheater 120. The configuration of the carbon dioxide recovery system 400 will be described below in detail.

Figure 2:
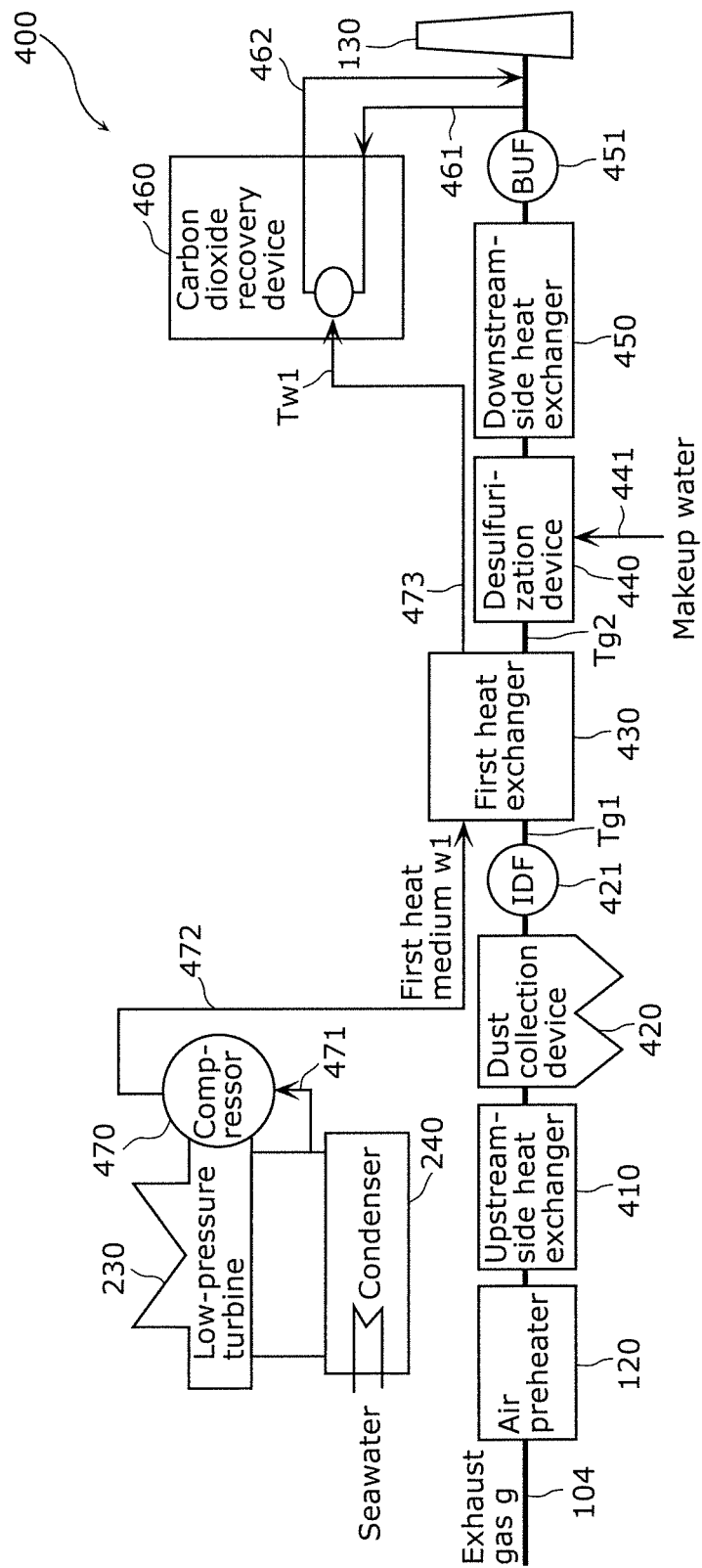
FIG. 2 is a pattern diagram illustrating a configuration of a carbon dioxide recovery system according to the embodiment of the present invention.

FIG. 2 is a pattern diagram illustrating the configuration of the carbon dioxide recovery system 400 according to the embodiment of the present invention.

As illustrated in the diagram, the carbon dioxide recovery system 400 includes an upstream-side heat exchanger 410, a dust collection device 420, a first heat exchanger 430, a desulfurization device 440, a downstream-side heat exchanger 450, a carbon dioxide recovery device 460, and a compressor 470. The carbon dioxide recovery system 400 recovers carbon dioxide in exhaust gas sequentially flowing from the boiler 100 to the denitration device 110, the air preheater 120, the upstream-side heat exchanger 410, the dust collection device 420, the first heat exchanger 430, the desulfurization device 440, the downstream-side heat exchanger 450, and the smokestack 130. The facilities included in the carbon dioxide recovery system 400 will be described below in detail.

The upstream-side heat exchanger 410 is a device that performs heat exchange between exhaust gas flowing from the boiler 100 toward the dust collection device 420 and a heat medium. Specifically, the upstream-side heat exchanger 410 is disposed between the air preheater 120 and the dust collection device 420, cools exhaust gas (hereinafter also referred to as exhaust gas g) flowing from the air preheater 120 to the dust collection device 420, and heats a heat medium (hereinafter also referred to as an upstream-side heat medium).

For example, the upstream-side heat exchanger 410 may be a gas-gas heater (GGH heat recovery device) that cools the exhaust gas g and heats the upstream-side heat medium as the upstream-side heat medium flows through a pipe and the exhaust gas g passes around the pipe. The upstream-side heat medium is intermediate-high-temperature fluid, and in the present embodiment, intermediate-high-temperature water (pure water), but may be intermediate-high temperature or high-temperature liquid other than such water, or gas such as steam. Accordingly, the upstream-side heat exchanger 410 cools, for example, the exhaust gas g (exhaust gas g on an exit side of the air preheater 120) at 135° C. approximately at an entrance for the exhaust gas to the exhaust gas g (exhaust gas g at an entrance side of the dust collection device 420) at 90° C. approximately at an exit for the exhaust gas.

The dust collection device 420 removes dust in exhaust gas. The dust collection device 420 is disposed between the upstream-side heat exchanger 410 and the first heat exchanger 430, and removes dust in the exhaust gas g flowing from the upstream-side heat exchanger 410 to the first heat exchanger 430. For example, the dust collection device 420 is a low-low temperature dry electric precipitator (EP) that attracts and removes dust in the exhaust gas g by electrostatic force. In this case, the temperature of the exhaust gas g on the entrance side of the dust collection device 420 is preferably 90° C. approximately.

An induced draft fan (IDF) 421 is provided on an exit side of the dust collection device 420. The induced draft fan 421 sucks exhaust gas on the exit side of the dust collection device 420 and transfers the exhaust gas to the first heat exchanger 430.

The first heat exchanger 430 is a device that performs heat exchange between exhaust gas flowing from the boiler 100 toward the desulfurization device 440 and a first heat medium flowing through compressor exit lines 472 and 473 to be described later. The first heat exchanger 430 is disposed between the boiler 100 and the desulfurization device 440, cools exhaust gas flowing from the boiler 100 to the desulfurization device 440, and heats the first heat medium. Specifically, the first heat exchanger 430 is disposed between the dust collection device 420 and the desulfurization device 440, cools the exhaust gas g flowing from the dust collection device 420 to the desulfurization device 440, and heats the first heat medium (hereinafter also referred to as a first heat medium w1).

For example, similarly to the upstream-side heat exchanger 410, the first heat exchanger 430 may be a gas-gas heater (GGH heat recovery device) that cools the exhaust gas g and heats the first heat medium w1 as the first heat medium w1 flows through a pipe and the exhaust gas g passes around the pipe. The first heat medium w1 is steam (water vapor) in the present embodiment, but may be intermediate-high temperature or high-temperature gas other than steam, or liquid such as intermediate-high temperature or high-temperature water.

Accordingly, the first heat exchanger 430 cools, for example, the exhaust gas g (exhaust gas g on the exit side of the dust collection device 420) having an exhaust-gas temperature Tg1 of 90° C. approximately at an entrance for the exhaust gas to the exhaust gas g (exhaust gas g on an entrance side of the desulfurization device 440) having an exhaust-gas temperature Tg2 of 60° C. approximately at an exit for the exhaust gas. The first heat exchanger 430 heats, for example, the first heat medium w1 as low-pressure saturated steam (heat medium on an exit side of the compressor 470 to be described later) at an entrance for the heat medium to low-pressure steam (heat medium at an entrance of the carbon dioxide recovery device 460 to be described later) having a heat-medium temperature Tw1 of 60° C. approximately at an exit for the heat medium.

In the present embodiment, the first heat exchanger 430 is disposed between the induced draft fan 421 and the desulfurization device 440, but may be disposed between the dust collection device 420 and the induced draft fan 421. However, in this case, the distance from the first heat exchanger 430 to the desulfurization device 440 increases, and thus the length of a section through which the exhaust gas g having the exhaust-gas temperature Tg2 of 60° C. approximately flows (which is a section that is likely to corrode) increases. Thus, the first heat exchanger 430 is preferably disposed near the desulfurization device 440.

The desulfurization device 440 removes sulfur oxide in exhaust gas. The desulfurization device 440 is disposed between the first heat exchanger 430 and the downstream-side heat exchanger 450, and removes sulfur oxide in the exhaust gas g flowing from the first heat exchanger 430 to the downstream-side heat exchanger 450. Specifically, the desulfurization device 440 is a wet desulfurization device that is connected with a makeup water line 441 and in which makeup water is supplied from the makeup water line 441 to an absorption tower (not illustrated) to perform wet desulfurization treatment. Thus, the temperature of exhaust gas on the entrance side of the desulfurization device 440 is preferably low, and is cooled to the exhaust-gas temperature Tg2 of 60° C. approximately by the first heat exchanger 430 as described above. Accordingly, the amount of makeup water supplied from the makeup water line 441 is reduced.

The downstream-side heat exchanger 450 is a device that performs heat exchange between exhaust gas flowing from the desulfurization device 440 toward the smokestack 130 and a heat medium. Specifically, the downstream-side heat exchanger 450 is disposed between the desulfurization device 440 and the smokestack 130, heats the exhaust gas g flowing from the desulfurization device 440 to the smokestack 130, and cools a heat medium (hereinafter also referred to as a downstream-side heat medium). For example, similarly to the upstream-side heat exchanger 410 and the like, the downstream-side heat exchanger 450 may be a gas-gas heater (GGH reheater) that heats the exhaust gas g and cools the downstream-side heat medium as the downstream-side heat medium flows through a pipe and the exhaust gas g passes around the pipe. Accordingly, the downstream-side heat exchanger 450 heats, for example, the exhaust gas g (exhaust gas g on an exit side of the desulfurization device 440) at 50° C. approximately at an entrance for the exhaust gas to the exhaust gas g (exhaust gas g on an entrance side of the smokestack 130) at 90° C. approximately at an exit for the exhaust gas.

The downstream-side heat medium is same as the upstream-side heat medium. Alternatively, a heat medium may circulate between the upstream-side heat exchanger 410 and the downstream-side heat exchanger 450, and in this case, the upstream-side heat medium and the downstream-side heat medium are same.

A boost-up fan (BUF) 451 is provided on an exit side of the downstream-side heat exchanger 450. The boost-up fan 451 increases the pressure of exhaust gas on the exit side of the downstream-side heat exchanger 450 and transfers the exhaust gas to the smokestack 130. In this manner, the exhaust gas, from which nitrogen oxide, dust (ash), sulfur oxide, and the like have been removed, is discharged from the smokestack 130.

The compressor 470 is a compressor coaxial with a turbine, and compresses steam discharged from the turbine. Specifically, the compressor 470 is coaxial with the steam turbine 200 (low-pressure turbine 230), disposed on a side of the low-pressure turbine 230, and driven by rotational force of the steam turbine 200 (low-pressure turbine 230). The compressor 470 compresses low-pressure saturated steam (low-pressure discharged steam) discharged from the low-pressure turbine 230. The disposition position of the compressor 470 is not particularly limited, and the compressor 470 may be disposed on the intermediate-pressure turbine 220 side of the low-pressure turbine 230 or may be disposed on the electric generator 300 side of the low-pressure turbine 230.

Specifically, low-pressure discharged steam from the low-pressure turbine 230 is supplied to the compressor 470 through a compressor entrance line 471 and compressed at the compressor 470. Then, the low-pressure discharged steam compressed at the compressor 470 is discharged as saturated steam having a pressure higher than that of the low-pressure discharged steam, and supplied to the first heat exchanger 430 through the compressor exit line 472. This steam supplied to the first heat exchanger 430 is the above-described first heat medium w1. Then, the first heat medium w1 is heated at the first heat exchanger 430 and discharged, and then supplied to the carbon dioxide recovery device 460 through the compressor exit line 473.

Low-pressure discharged steam not supplied to the compressor 470 is transferred to a condenser 240 and condensed to water at the condenser 240, but the amount of low-pressure discharged steam transferred to the condenser 240 decreases due to the supply of low-pressure discharged steam to the compressor 470. Accordingly, the amount of low-pressure discharged steam cooled by seawater at the condenser 240 decreases, which leads to the seawater discharge at lower temperature.

When discharged steam from the high-pressure turbine 210 or the intermediate-pressure turbine 220 is used as the first heat medium w1 because, for example, the steam turbine 200 does not include the low-pressure turbine 230, the compressor 470 may compress the discharged steam, or no compressor 470 may be provided when the discharged steam does not need to be compressed.

The carbon dioxide recovery device 460 separates and recovers carbon dioxide from an absorber having absorbed the carbon dioxide when supplied with heat of the first heat medium w1. In other words, the carbon dioxide recovery device 460 separates and recovers carbon dioxide from the absorber when supplied with heat of steam discharged from the low-pressure turbine 230 and compressed by the compressor 470.

The absorber is an absorption material that is capable of absorbing (adsorbing) carbon dioxide, and in the present embodiment, a solid absorption material. For example, the absorber is a porous carrier in which an amine absorber is impregnated, a porous carrier in which a solid agent capable of absorbing carbon dioxide is adsorbed, or a solid particle capable of absorbing carbon dioxide. These absorbers absorb carbon dioxide in gas and separate the carbon dioxide with steam at a predetermined temperature (for example, 60° C.). The absorber is not limited to the above-described solid absorption material, but may be a conventionally known absorption material, for example, a liquid absorption material such as amine absorption liquid as appropriate.

Accordingly, when supplied with the exhaust gas g, the carbon dioxide recovery device 460 separates and recovers carbon dioxide from the absorber through supply of heat of the first heat medium w1 to the absorber having absorbed the carbon dioxide in the exhaust gas g.

Specifically, the exhaust gas g is taken out through an exhaust-gas take-out pipe 461 between the downstream-side heat exchanger 450 and the smokestack 130 and supplied to the carbon dioxide recovery device 460. The exhaust gas g supplied to the carbon dioxide recovery device 460 contacts the absorber, and carbon dioxide in the exhaust gas g is absorbed by the absorber. Then, the exhaust gas g from which the carbon dioxide is removed is returned to a system between the downstream-side heat exchanger 450 and the smokestack 130 through an exhaust-gas return pipe 462. Then, the absorber having absorbed the carbon dioxide is heated by the first heat medium w1 supplied to the carbon dioxide recovery device 460 through the compressor exit line 473, and separates the carbon dioxide. Accordingly, the carbon dioxide recovery device 460 recovers the carbon dioxide in the exhaust gas g.

The position at which the exhaust-gas take-out pipe 461 and the exhaust-gas return pipe 462 are connected does not need to be between the downstream-side heat exchanger 450 and the smokestack 130, but may be another position on the flue 104 such as a position between the desulfurization device 440 and the downstream-side heat exchanger 450. However, to maintain the performance of the carbon dioxide recovery device 460, the exhaust gas g from which any unnecessary material is removed is preferably supplied to the carbon dioxide recovery device 460. Thus, the exhaust-gas take-out pipe 461 and the exhaust-gas return pipe 462 are preferably connected downstream of the desulfurization device 440 (between the desulfurization device 440 and the smokestack 130).

Figure 3:
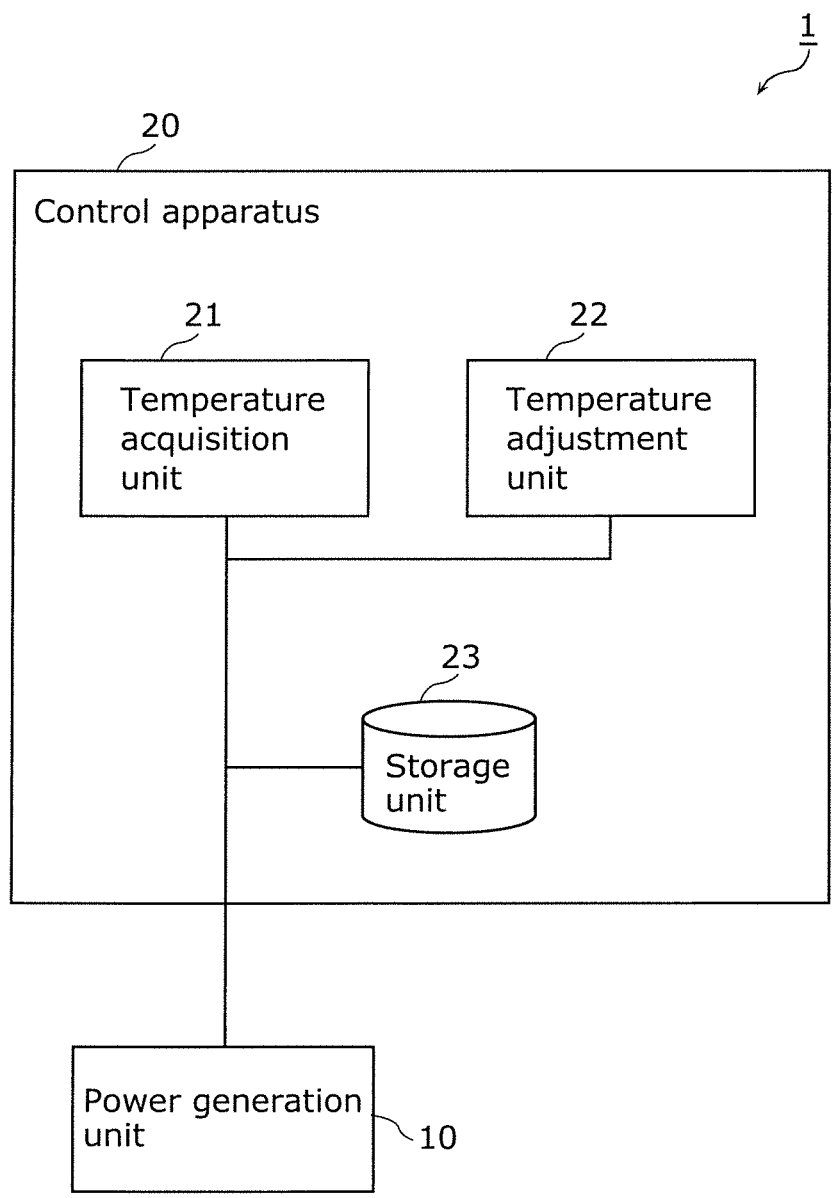
FIG. 3 is a block diagram illustrating a functional configuration of a control apparatus according to the embodiment of the present invention.

Description will be made as to the configuration of the control apparatus 20 included in the thermal power plant 1 and processing performed by the control apparatus 20 in detail. FIG. 3 is a block diagram illustrating a functional configuration of the control apparatus 20 according to the embodiment of the present invention.

The control apparatus 20 controls devices included in the power generation unit 10, and specifically, controls various kinds of devices such as the boiler 100, the steam turbine 200, the electric generator 300, and the carbon dioxide recovery system 400. The control apparatus 20 controls the boiler 100, the steam turbine 200, the electric generator 300, and the like in manners similar to those conventionally done, and thus detailed description thereof will be omitted, and description will be made as to a method of controlling the carbon dioxide recovery system 400 in detail.

The control apparatus 20 cools the exhaust gas g flowing from the boiler 100 to the desulfurization device 440 and heats the first heat medium w1 by the first heat exchanger 430 disposed between the boiler 100 and the desulfurization device 440 (heat exchange process). Specifically, the control apparatus 20 cools the exhaust gas g to a desired temperature and heats the first heat medium w1 to a desired temperature by adjusting the flow rate and flow speed of the first heat medium w1 flowing to the first heat exchanger 430. Then, the control apparatus 20 supplies heat of the first heat medium w1 to the carbon dioxide recovery device 460 to separate and recover carbon dioxide from the absorber having absorbed the carbon dioxide (carbon dioxide recovery process). As illustrated in FIG. 3, the control apparatus 20 includes a temperature acquisition unit 21, a temperature adjustment unit 22, and a storage unit 23.

The storage unit 23 is a memory that stores data necessary for processing performed by each processing unit included in the control apparatus 20. The storage unit 23 stores, for example, the flow rates and temperatures (such as the heat-medium temperature Tw1 and the exhaust-gas temperatures Tg1 and Tg2) of a heat medium and exhaust gas at each place in the carbon dioxide recovery system 400.

The temperature acquisition unit 21 acquires a first temperature as the temperature of the exhaust gas g at an exit of the first heat exchanger 430 for exhaust gas, and a second temperature as the temperature of heat supplied to the carbon dioxide recovery device 460. In other words, the temperature acquisition unit 21 acquires the exhaust-gas temperature Tg2 as the first temperature, and acquires the heat-medium temperature Tw1 as the second temperature. Specifically, the temperature acquisition unit 21 acquires the first temperature and the second temperature by referring to data stored in the storage unit 23 to read the exhaust-gas temperature Tg2 and the heat-medium temperature Tw1 from the storage unit 23.

The temperature adjustment unit 22 adjusts the first temperature acquired by the temperature acquisition unit 21 to a temperature in a first predetermined range, and adjusts the second temperature to a temperature in a second predetermined range. Specifically, the temperature adjustment unit 22 adjusts the first temperature (exhaust-gas temperature Tg2) to a temperature in the first predetermined range to decrease the temperature on the entrance side of the desulfurization device 440. For example, the temperature adjustment unit 22 sets the temperature in the first predetermined range to be 60° C. approximately, and performs adjustment so that the first temperature becomes equal to 60° C. approximately. In addition, the temperature adjustment unit 22 adjusts the second temperature (heat-medium temperature Tw1) to a temperature in the second predetermined range to set the temperature of the first heat medium w1 supplied to the carbon dioxide recovery device 460 to an appropriate temperature. For example, the temperature adjustment unit 22 sets the temperature in the second predetermined range to be 60° C. approximately, and performs adjustment so that the second temperature becomes equal to 60° C. approximately. For example, the temperature adjustment unit 22 adjusts each of the first temperature and the second temperature to a temperature in a desired range by adjusting the flow rate and flow speed of the first heat medium w1 flowing to the first heat exchanger 430.

As described above, the carbon dioxide recovery system 400 according to the embodiment of the present invention includes the first heat exchanger 430 that cools the exhaust gas g and heats the first heat medium w1 between the boiler 100 and the desulfurization device 440, and the carbon dioxide recovery device 460 that separates and recovers carbon dioxide from the absorber when supplied with heat of the first heat medium w1. Accordingly, heat of the first heat medium w1 having exchanged heat with the exhaust gas g between the boiler 100 and the desulfurization device 440 is supplied to the carbon dioxide recovery device 460, and carbon dioxide is separated and recovered from the absorber. Any unnecessary material is removed from the exhaust gas g after leaving the boiler 100 by any other device before the desulfurization device 440 and the desulfurization device 440, and thus the exhaust gas g needs to be cooled to decrease the temperature of the exhaust gas g so that the performance of these devices is maintained. Accordingly, heat of the first heat medium w1 heated when the exhaust gas g is cooled can be used to separate and recover carbon dioxide, which leads to effective use of energy, thereby achieving energy saving.

Since the first heat exchanger 430 is disposed between the dust collection device 420 and the desulfurization device 440, heat of the first heat medium w1 having exchanged heat with the exhaust gas g between the dust collection device 420 and the desulfurization device 440 is supplied to the carbon dioxide recovery device 460, and carbon dioxide is separated and recovered from the absorber. When the exhaust gas g after leaving the boiler 100 is supplied to the desulfurization device 440, the exhaust gas g needs to be cooled to decrease the temperature of the exhaust gas g so that the performance of the desulfurization device 440 is maintained. Thus, heat of the first heat medium w1 heated when the exhaust gas g is cooled can be used to separate and recover carbon dioxide, which leads to effective use of energy, thereby achieving energy saving.

Carbon dioxide is separated and recovered from the absorber through supply of heat of steam discharged from the low-pressure turbine 230 and compressed by the compressor 470 coaxial with the low-pressure turbine 230 to the carbon dioxide recovery device 460. Since steam discharged from the low-pressure turbine 230 is compressed by the compressor 470 coaxial with the low-pressure turbine 230, the steam can be transferred to the carbon dioxide recovery device 460. Accordingly, the steam discharged from the low-pressure turbine 230 is used for a heat medium, which leads to effective use of heat of the steam. In addition, the compressor 470, which is coaxial with the low-pressure turbine 230, can be driven by the power of the low-pressure turbine 230, and thus does not need power dedicated for driving the compressor 470. Moreover, the compressor 470 needs to be able to increase the pressure of steam but does not need to be able to increase the temperature of the steam, and thus may be a small-sized compressor having power smaller than that of the compressor disclosed in JP 2012-250142. In this manner, in the carbon dioxide recovery system 400, heat of steam discharged from the low-pressure turbine 230 is effectively used, and the compressor 470 has reduced power and is driven by the power of the low-pressure turbine 230, thereby achieving energy saving.

The carbon dioxide recovery device 460 separates and recovers carbon dioxide from the absorber through supply of heat of the first heat medium w1 to the absorber having absorbed carbon dioxide in the exhaust gas g after leaving the boiler 100. Accordingly, it is possible to recover carbon dioxide in the exhaust gas g while achieving energy saving.

Since the first heat exchanger 430 and the carbon dioxide recovery device 460 are disposed relatively close to each other, the distance from the first heat exchanger 430 to the carbon dioxide recovery device 460 by which the first heat medium w1 is transferred is shortened, which leads to reduction of a loss at transfer of the first heat medium w1.

The control apparatus 20 adjusts each of the temperature of the exhaust gas g on the exit side of the first heat exchanger 430 and the temperature of heat supplied to the carbon dioxide recovery device 460 to a temperature in a desired range. Thus, it is possible to maintain the performance of a device for removing any unnecessary material in the exhaust gas g by adjusting the temperature of the exhaust gas g at the exit of the first heat exchanger 430 to a temperature in the desired range. In addition, it is possible to efficiently recover carbon dioxide by adjusting the temperature of heat supplied to the carbon dioxide recovery device 460 to a temperature in the desired range. Accordingly, it is possible to efficiently remove and recover any unnecessary material and carbon dioxide in the exhaust gas g while achieving energy saving.

It should be noted that the present invention can be implemented not only as the carbon dioxide recovery system 400 as described above, but also as the carbon dioxide recovery method including characteristic processing steps performed by the carbon dioxide recovery system 400. In addition, the present invention can be implemented as the control apparatus 20 included by the carbon dioxide recovery system 400. Furthermore, the present invention can be implemented as a control method performed by the control apparatus 20, or as an integrated circuit which includes characteristic processing units included in the control apparatus 20. In addition, the present invention can be implemented as a program for causing a computer to execute characteristic processes included in the control method, or as a computer readable recording medium such as a compact disc read only memory (CD-ROM) on which the program is recorded. It should be understood that the above-described program can be distributed via a recording medium such as a CD-ROM or a transmission medium such as the Internet.

(Variation 1)

Figure 4:
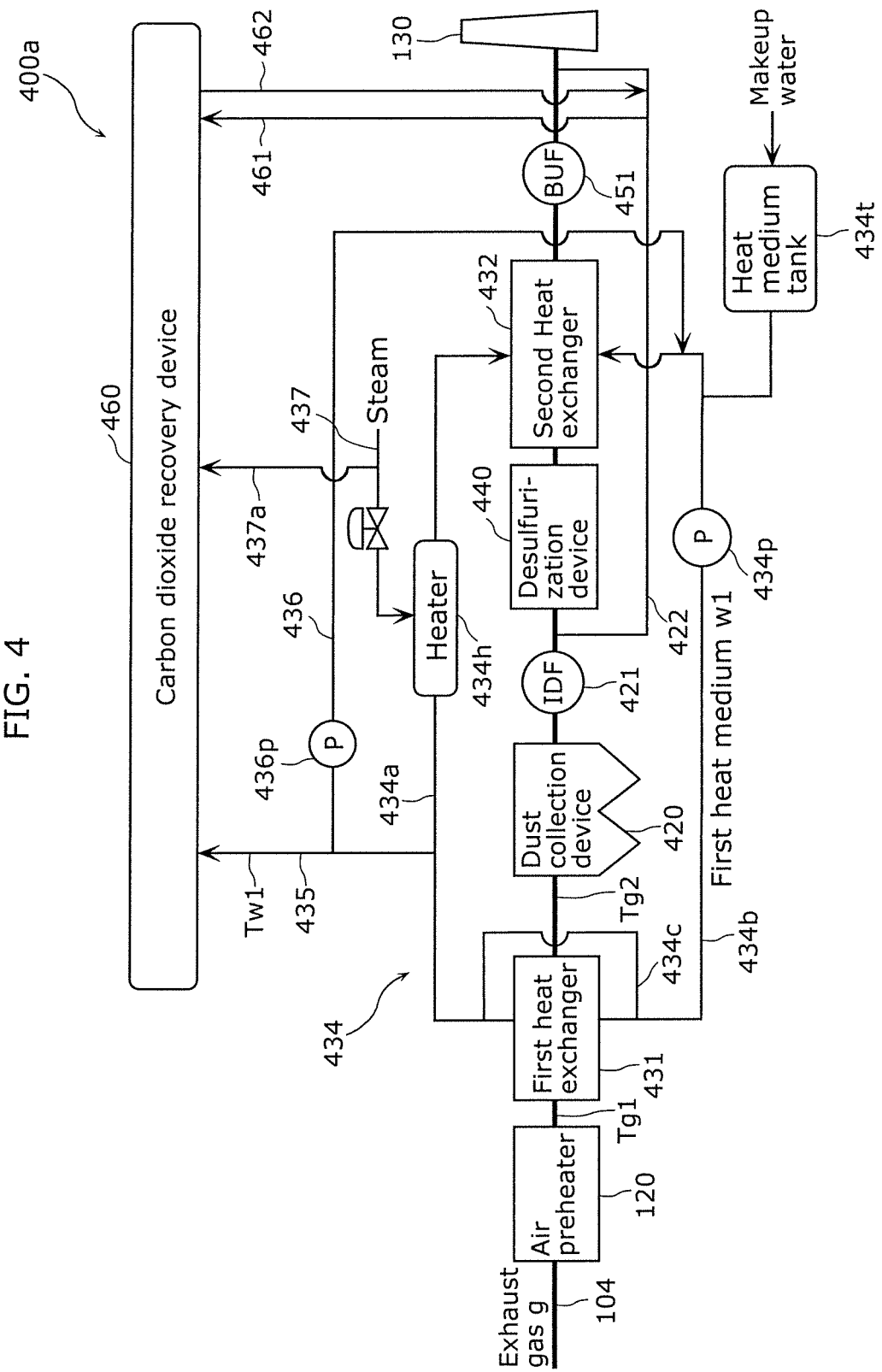
FIG. 4 is a pattern diagram illustrating a configuration of a carbon dioxide recovery system according to Variation 1 of the embodiment of the present invention.

Description will be made as to Variation 1 of the above-described embodiment. FIG. 4 is a pattern diagram illustrating the configuration of a carbon dioxide recovery system 400*a* according to Variation 1 of the embodiment of the present invention.

As illustrated in the diagram, the carbon dioxide recovery system 400*a* in the present variation includes a first heat exchanger 431, the dust collection device 420, the desulfurization device 440, a second heat exchanger 432, a heat medium circulation line 434, and the carbon dioxide recovery device 460. The dust collection device 420, the desulfurization device 440, and the carbon dioxide recovery device 460 have configurations same as those in the above-described embodiment, and thus detailed description thereof will be omitted.

The first heat exchanger 431 is a device that performs heat exchange between exhaust gas flowing from the boiler 100 toward the dust collection device 420 and a heat medium flowing through the heat medium circulation line 434. The first heat exchanger 431 is disposed between the boiler 100 and the dust collection device 420, cools the exhaust gas g flowing from the boiler 100 to the dust collection device 420, and heats the first heat medium w1. Specifically, the first heat exchanger 431 is disposed between the air preheater 120 and the dust collection device 420, cools the exhaust gas g flowing from the air preheater 120 to the dust collection device 420, and heats the first heat medium w1 flowing through the heat medium circulation line 434.

The first heat exchanger 431 may be a gas-gas heater (GGH heat recovery device) having a configuration same as that of the upstream-side heat exchanger 410 in the above-described embodiment. The first heat medium w1 may be same as the upstream-side heat medium in the above-described embodiment.

Accordingly, the first heat exchanger 431 cools, for example, the exhaust gas g having the exhaust-gas temperature Tg1 of 135° C. approximately (the exhaust gas g on the exit side of the air preheater 120) at an entrance for the exhaust gas to the exhaust gas g having the exhaust-gas temperature Tg2 of 90° C. approximately (the exhaust gas g on the entrance side of the dust collection device 420) at an exit for the exhaust gas. The first heat exchanger 431 heats, for example, the first heat medium w1 (heat medium on an exit side of a second line 434*b* to be described later) at 70° C. approximately at an entrance for the heat medium to the first heat medium w1 (heat medium on an entrance side of a first line 434*a* to be described later) at 110° C. approximately at an exit for the heat medium.

The second heat exchanger 432 is a device that performs heat exchange between exhaust gas flowing from the desulfurization device 440 toward the smokestack 130 and a heat medium flowing through the heat medium circulation line 434. The second heat exchanger 432 is disposed between the desulfurization device 440 and the smokestack 130, heats the exhaust gas g flowing from the desulfurization device 440 to the smokestack 130, and cools the first heat medium w1. The second heat exchanger 432 may be a gas-gas heater (GGH reheater) having a configuration same as that of the downstream-side heat exchanger 450 in the above-described embodiment.

Accordingly, the second heat exchanger 432 heats, for example, the exhaust gas g (exhaust gas g on the exit side of the desulfurization device 440) at 50° C. approximately at an entrance for the exhaust gas to the exhaust gas g (exhaust gas g on the entrance side of the smokestack 130) at 90° C. approximately at an exit for the exhaust gas. The second heat exchanger 432 cools, for example, the first heat medium w1 (heat medium on the exit side of the first line 434a to be described later) at 110° C. approximately at an entrance for the heat medium to the first heat medium w1 (heat medium on the entrance side of the second line 434b to be described later) at 70° C. approximately at an exit for the heat medium.

The above-described first heat medium w1 circulates through the heat medium circulation line 434 between the first heat exchanger 431 and the second heat exchanger 432. Specifically, the heat medium circulation line 434 includes the first line 434a and the second line 434b. The first line 434a is a line (pipe) connecting an exit of the first heat exchanger 431 for the first heat medium w1 and an entrance of the second heat exchanger for the first heat medium w1. The second line 434b is a line (pipe) connecting an exit of the second heat exchanger 432 for the first heat medium w1 and an entrance of the first heat exchanger 431 for the first heat medium w1.

In other words, the heat medium circulation line 434 is constituted in a configuration in which an end part of the first line 434a on the entrance side (the first heat exchanger 431 side) and an end part of the second line 434b on the exit side (the first heat exchanger 431 side) are connected with each other, and an end part of the first line 434a (the second heat exchanger 432 side) on the exit side and an end part of the second line 434b (the second heat exchanger 432 side) on the entrance side are connected with each other. A pump 434p is provided on the second line 434b to adjust the flow rate and flow speed of the first heat medium w1 circulating through the heat medium circulation line 434.

The carbon dioxide recovery system 400a further includes a third line 435 bifurcated from the first line 434a. The third line 435 has an entrance-side end part connected with the first line 434a, and an exit-side end part connected with the heat-medium entrance of the carbon dioxide recovery device 460. Accordingly, the first heat medium w1 is supplied from the first line 434a to the carbon dioxide recovery device 460 through the third line 435. For example, the first heat medium w1 is depressurized at the third line 435 to low-pressure saturated steam having the heat-medium temperature Tw1 of 60° C. approximately, and supplied to the carbon dioxide recovery device 460.

Accordingly, the carbon dioxide recovery device 460 separates and recovers carbon dioxide from the absorber when supplied with heat of the first heat medium w1 flowing through the first line 434a. Specifically, the carbon dioxide recovery device 460 is connected with the third line 435 bifurcated from the first line 434a, and separates and recovers carbon dioxide from the absorber when supplied with the first heat medium w1 from the first line 434a.

The carbon dioxide recovery system 400a further includes a fourth line 436 bifurcated from the third line 435 and connected with the second line 434b. A pump 436p is provided on the fourth line 436, and the first heat medium w1 not supplied to the carbon dioxide recovery device 460 is returned to the second line 434b through the fourth line 436. The second line 434b is connected with a heat medium tank 434t, and the first heat medium w1 is supplied from the heat medium tank 434t when the first heat medium w1 circulating through the heat medium circulation line 434 is insufficient.

The heat medium circulation line 434 is provided with a bypass line 434c bypassing the first heat exchanger 431, and when heat is excessive, for example, in summer, the first heat exchanger 431 is bypassed to prevent excessive heating of the first heat medium w1. The first line 434a is provided with a heater 434h that heats the first heat medium w1, and when heat is insufficient, for example, in winter, the first heat medium w1 flowing through the first line 434a is heated by steam supplied from a steam line 437. The steam may be, for example, auxiliary steam generated in the thermal power plant 1. When heat of the first heat medium w1 supplied to the carbon dioxide recovery device 460 is insufficient, the steam is supplied to the carbon dioxide recovery device 460 through a steam line 437a.

The flue 104 is provided with a desulfurization bypass line 442 bypassing the desulfurization device 440. The desulfurization bypass line 442 is connected with the exhaust-gas take-out pipe 461 and the exhaust-gas return pipe 462. Accordingly, the carbon dioxide recovery device 460 separates and recovers carbon dioxide from exhaust gas passing through the desulfurization bypass line 442. The exhaust-gas take-out pipe 461 and the exhaust-gas return pipe 462 may be connected with places same as those in the above-described embodiment.

In this manner, the carbon dioxide recovery system 400a according to the present variation can achieve effects same as those of the above-described embodiment. In particular, since the first heat exchanger 431 is disposed between the boiler 100 and the dust collection device 420, heat of the first heat medium w1 having exchanged heat with the exhaust gas g between the boiler 100 and the dust collection device 420 is supplied to the carbon dioxide recovery device 460, and carbon dioxide is separated and recovered from the absorber. When the high-temperature exhaust gas g after leaving the boiler 100 is supplied to the dust collection device 420, the exhaust gas g needs to be cooled to decrease the temperature of the exhaust gas g to an appropriate temperature so that the performance of the dust collection device 420 is maintained. Thus, heat of the first heat medium w1 heated when the exhaust gas g is cooled can be used to separate and recover carbon dioxide, which leads to effective use of energy, thereby achieving energy saving.

The carbon dioxide recovery system 400a further includes the second heat exchanger 432 that heats the exhaust gas g and cools the first heat medium w1 between the desulfurization device 440 and the smokestack 130, and the heat medium circulation line 434 for circulation through the first heat exchanger 431 and the second heat exchanger 432. The carbon dioxide recovery device 460 separates and recovers carbon dioxide from the absorber when supplied with heat of the first heat medium w1 flowing through the first line 434a connecting the exit of the first heat exchanger 431 and the entrance of the second heat exchanger 432. In other words, the carbon dioxide recovery device 460 separates and recovers carbon dioxide from the absorber when supplied with the first heat medium w1 from the first line 434a. Accordingly, the first heat medium w1 flowing through the first line 434a can be used to separate and recover carbon dioxide, which leads to effective use of energy, thereby achieving energy saving.

In the above-described Variation 1, the first heat exchanger 431 is disposed between the air preheater 120 and the dust collection device 420. However, similarly to the above-described embodiment, the first heat exchanger 431 may be disposed between the dust collection device 420 and the desulfurization device 440.

(Variation 2)

Figure 5:
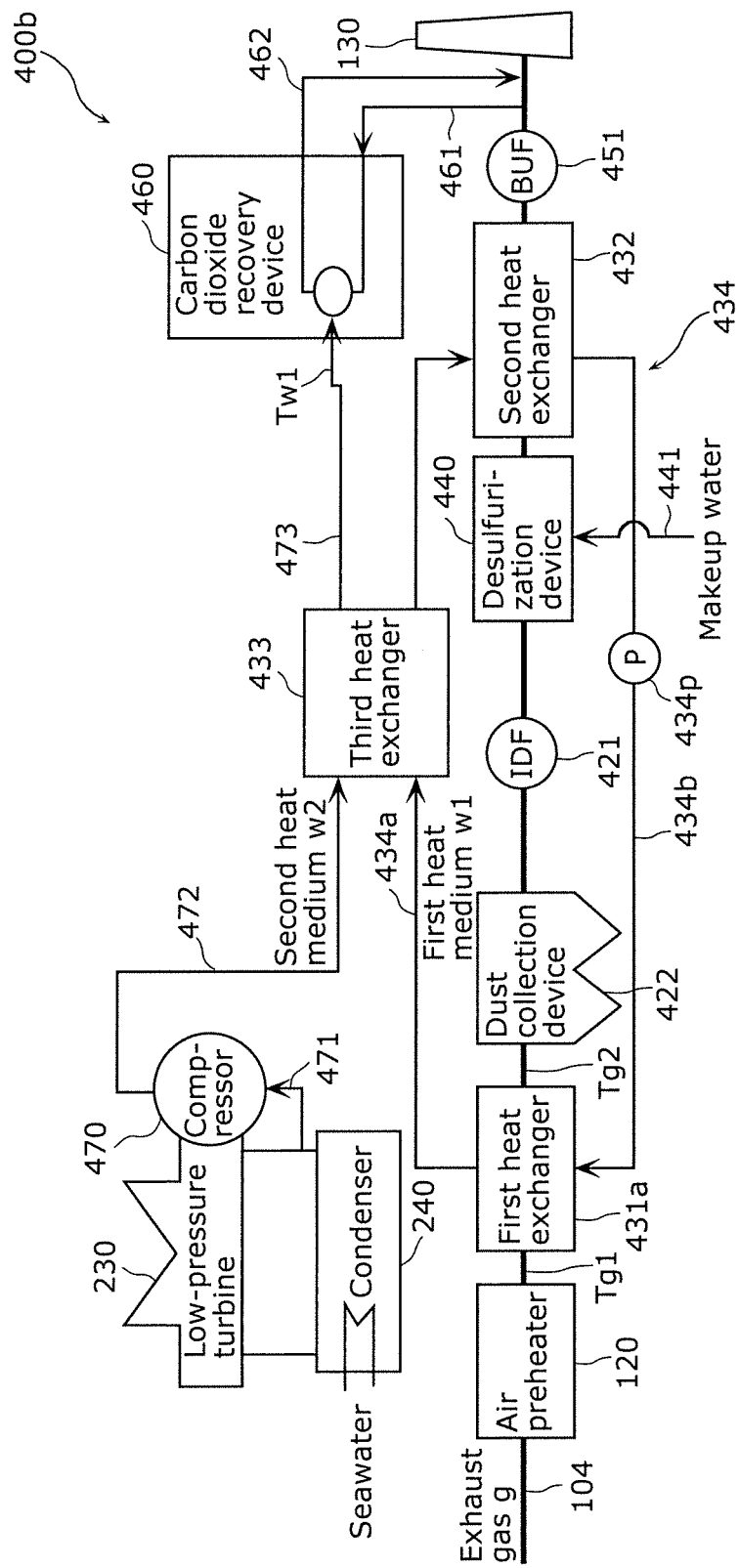
FIG. 5 is a pattern diagram illustrating a configuration of a carbon dioxide recovery system according to Variation 2 of the embodiment of the present invention.

Description will be made as to Variation 2 of the above-described embodiment. FIG. 5 is a pattern diagram illustrating the configuration of a carbon dioxide recovery system 400b according to Variation 2 of the embodiment of the present invention.

As illustrated in the diagram, the carbon dioxide recovery system 400b in the present variation includes a first heat exchanger 431a, a dust collection device 422, the desulfurization device 440, the second heat exchanger 432, a third heat exchanger 433, the heat medium circulation line 434, the carbon dioxide recovery device 460, and the compressor 470. The desulfurization device 440, the carbon dioxide recovery device 460, and the compressor 470 have configurations same as those in the above-described embodiment, and the second heat exchanger 432 and the heat medium circulation line 434 have configurations same as those in the above-described Variation 1, and thus detailed description thereof will be omitted.

In the present variation, to effectively use heat by decreasing the temperature of the exhaust gas g upstream of the desulfurization device 440, the first heat exchanger 431a is a large-sized gas-gas heater (GGH heat recovery device) capable of cooling the exhaust gas g having the exhaust-gas temperature Tg1 of 135° C. approximately to the exhaust-gas temperature Tg2 of 60° C. approximately. Thus, the temperature of the exhaust gas g on the entrance side of the dust collection device 422 is equal to the exhaust-gas temperature Tg2 of 60° C. approximately, and thus the dust collection device 422 is a bug filter in the present variation. Accordingly, the first heat exchanger 431a can receive a larger amount of heat from the exhaust gas g, thereby achieving energy saving. The first heat medium w1 corresponds to the first heat medium w1 in the above-described Variation 1.

The third heat exchanger 433 is disposed on the first line 434a of the heat medium circulation line 434, cools the first heat medium w1 heated by the first heat exchanger 431a, and heats a second heat medium w2. The configuration of the third heat exchanger 433 is same as the configurations of the first heat exchanger 431a and the second heat exchanger 432.

The second heat medium w2 is steam obtained after low-pressure discharged steam from the low-pressure turbine 230 is compressed by the compressor 470, and corresponds to the first heat medium w1 in the above-described embodiment. Accordingly, the carbon dioxide recovery device 460 separates and recovers carbon dioxide from the absorber when supplied with heat of the second heat medium w2. In other words, the carbon dioxide recovery device 460 separates and recovers carbon dioxide from the absorber when supplied with heat of the first heat medium w1 through the second heat medium w2.

In this manner, the carbon dioxide recovery system 400b according to the present variation can achieve effects same as those of the above-described embodiment or Variation 1. In particular, the carbon dioxide recovery device 460 separates and recovers carbon dioxide from the absorber when supplied with heat of the second heat medium w2 heated through heat exchange with the first heat medium w1. Accordingly, heat of the first heat medium w1 is used to separate and recover carbon dioxide through the second heat medium w2, which leads to effective use of energy, thereby achieving energy saving.

In the above-described Variation 2, the first heat exchanger 431a is disposed between the air preheater 120 and the dust collection device 422, but the first heat exchanger 431a may be disposed between the dust collection device 422 and the desulfurization device 440, depending on the temperature condition of exhaust gas passing through the dust collection device 422.

(Variation 3)

Figure 6:
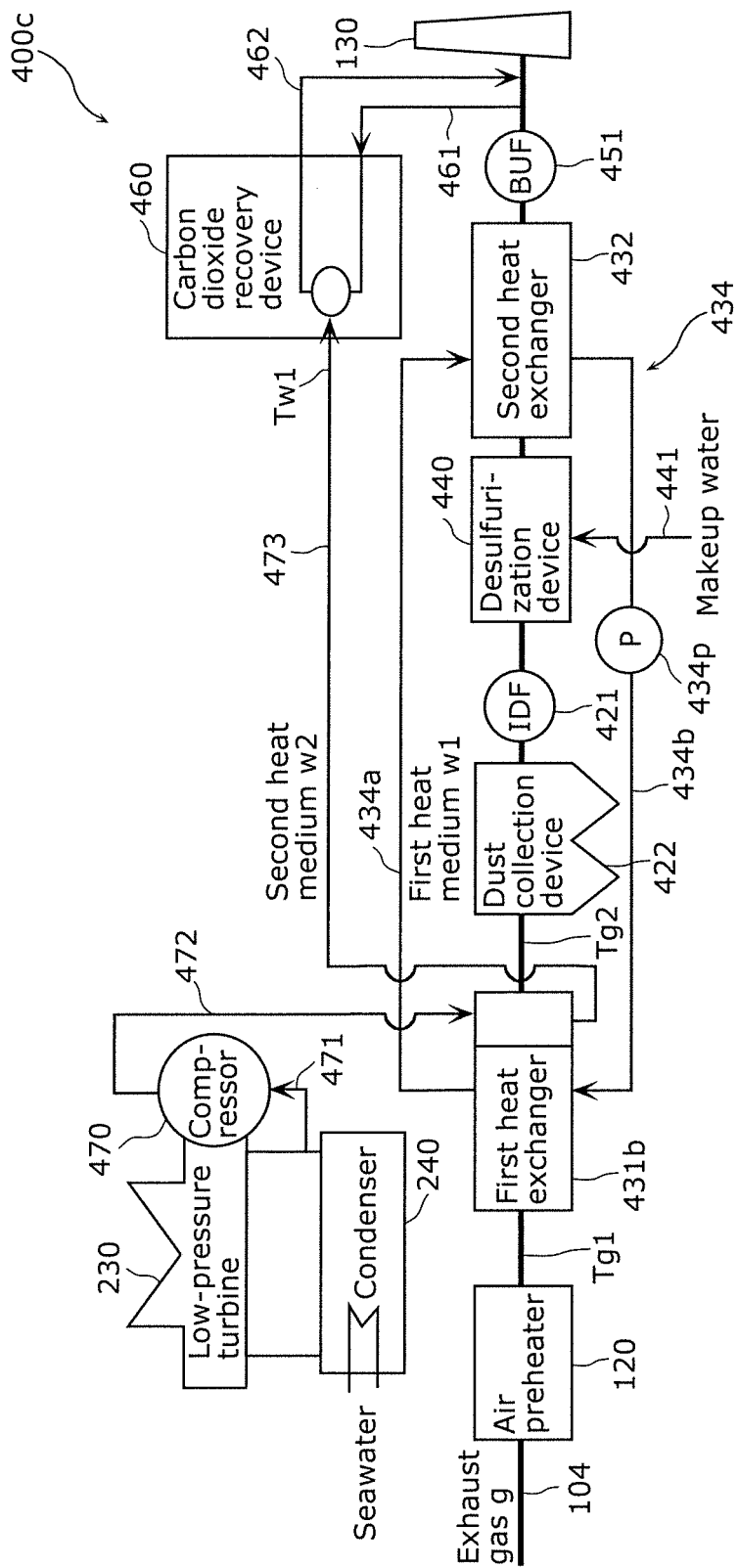
FIG. 6 is a pattern diagram illustrating a configuration of a carbon dioxide recovery system according to Variation 3 of the embodiment of the present invention.

Description will be made as to Variation 3 of the above-described embodiment. FIG. 6 is a pattern diagram illustrating the configuration of a carbon dioxide recovery system 400c according to Variation 3 of the embodiment of the present invention.

As illustrated in the diagram, the carbon dioxide recovery system 400c in the present variation includes a first heat exchanger 431b, the dust collection device 422, the desulfurization device 440, the second heat exchanger 432, the heat medium circulation line 434, the carbon dioxide recovery device 460, and the compressor 470. In other words, the carbon dioxide recovery system 400c in the present variation includes the first heat exchanger 431b in place of the first heat exchanger 431a and the third heat exchanger 433 of the carbon dioxide recovery system 400b in the above-described Variation 2. Accordingly, the dust collection device 422, the desulfurization device 440, the second heat exchanger 432, the heat medium circulation line 434, the carbon dioxide recovery device 460, and the compressor 470 have configurations same as those in the above-described Variation 2, and thus detailed description thereof will be omitted.

Similarly to the first heat exchanger 431a of the above-described Variation 2, the first heat exchanger 431b is a large-sized gas-gas heater (GGH heat recovery device), but performs heat exchange between the exhaust gas g and each of the first heat medium w1 and the second heat medium w2, which is a difference from the first heat exchanger 431a of the above-described Variation 2. Specifically, the first heat exchanger 431b performs heat exchange between the exhaust gas g and the first heat medium w1 and then performs heat exchange between the exhaust gas g and the second heat medium w2. Accordingly, the second heat medium w2 is heated and supplied to the carbon dioxide recovery device 460.

Similarly to the above-described Variation 2, the second heat medium w2 is steam obtained after low-pressure discharged steam from the low-pressure turbine 230 is compressed by the compressor 470, and corresponds to the first heat medium w1 in the above-described embodiment.

In this manner, the carbon dioxide recovery system 400c according to the present variation can achieve effects same as those of the above-described Variation 2. In the present variation, the third heat exchanger 433 does not need to be provided, unlike the above-described Variation 2, which leads to a simplified facility. In the present variation, too, the first heat exchanger 431b may be disposed between the dust collection device 422 and the desulfurization device 440.

(Variation 4)

Figure 7:
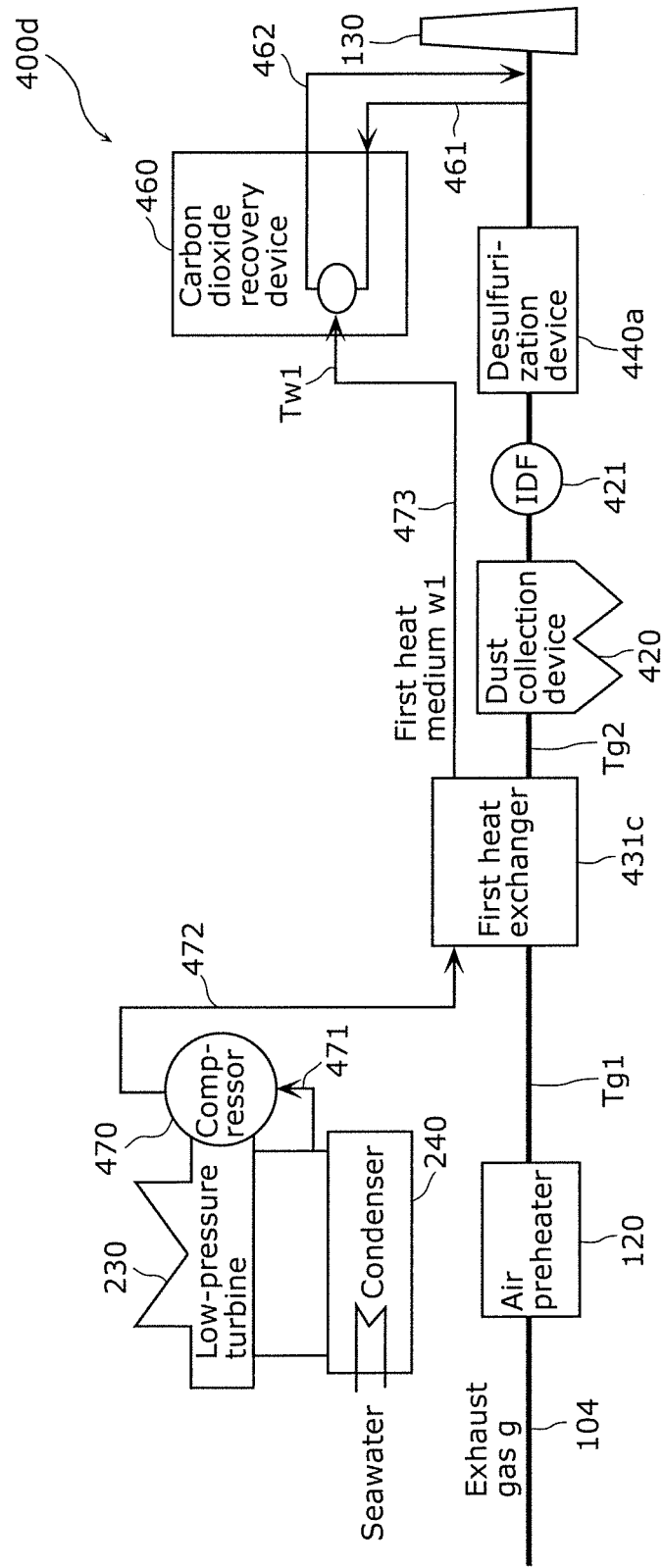
FIG. 7 is a pattern diagram illustrating a configuration of a carbon dioxide recovery system according to Variation 4 of the embodiment of the present invention.

Description will be made as to Variation 4 of the above-described embodiment. FIG. 7 is a pattern diagram illustrating the configuration of a carbon dioxide recovery system 400d according to Variation 4 of the embodiment of the present invention.

As illustrated in the diagram, the carbon dioxide recovery system 400d in the present variation includes a first heat exchanger 431c, the dust collection device 420, a desulfurization device 440a, the carbon dioxide recovery device 460, and the compressor 470. In other words, the carbon dioxide recovery system 400d in the present variation does not include the upstream-side heat exchanger 410 and the downstream-side heat exchanger 450 of the carbon dioxide recovery system 400 in the above-described embodiment, but includes the first heat exchanger 431c and the desulfurization device 440a in place of the first heat exchanger 430 and the desulfurization device 440.

Specifically, the desulfurization device 440a is a dry desulfurization device. Accordingly, the temperature of the exhaust gas g on an exit side of the desulfurization device 440a is not decreased, and thus no heat exchanger (downstream-side heat exchanger 450 in the above-described embodiment) needs to be provided downstream of the desulfurization device 440a. In addition, the temperature of the exhaust gas g upstream of the desulfurization device 440a does not need to be decreased, and thus the first heat exchanger 431c can be provided upstream of the dust collection device 420. Accordingly, the upstream-side heat exchanger 410 in the above-described embodiment does not need to be provided.

With such a configuration, the first heat exchanger 431c cools the exhaust gas g having the exhaust-gas temperature Tg1 of 135° C. approximately to the exhaust-gas temperature Tg2 of 90° C. approximately. Accordingly, the first heat exchanger 431c can receive a larger amount of heat from the exhaust gas g than the first heat exchanger 430 in the above-described embodiment. The first heat medium w1 corresponds to the first heat medium w1 in the above-described embodiment.

In this manner, the carbon dioxide recovery system 400d according to the present variation can achieve effects same as those of the above-described embodiment, and as described above, can have a simplified facility as compared to that in the above-described embodiment, and can receive a larger amount of heat from the exhaust gas g, thereby achieving energy saving.

Although the carbon dioxide recovery systems according to the embodiment of the present invention and the variations thereof are described above, the present invention is not limited to the above-described embodiment and the variations thereof. The embodiment and variations disclosed in the specification are exemplary in any aspects and not restrictive. The scope of the present invention is indicated by the claims, not by the above description, and includes equivalents to the claims and all modifications in the range of the claims.

For example, in the above-described embodiment and the variations thereof, the boiler 100 combusts coal (pulverized coal) as fuel supplied from the fuel supply device 101. However, the fuel supplied from the fuel supply device 101 is not limited to coal but may be any fuel, for example, fossil fuel such as oil fuel, which is heavy oil or crude oil, or liquefied natural gas (LNG), or fuel other than fossil fuel, such as biomass fuel. Accordingly, the boiler 100 may combust any of these fuels, or may combust two or more of these fuels in mixture.

In the above-described embodiment and the variations thereof, the boiler 100 is a constant-pressure once-through boiler. However, the boiler 100 is not limited to a constant-pressure once-through boiler, but may be a boiler of any type such as a variable-pressure once-through boiler.

In the above-described embodiment and the variations thereof, each carbon dioxide recovery system includes various kinds of devices such as the dust collection device and the desulfurization device in addition to the first heat exchanger and the carbon dioxide recovery device 460. However, the carbon dioxide recovery system only needs to include the first heat exchanger and the carbon dioxide recovery device 460, and the other devices may not be included in the concept of the carbon dioxide recovery system.

In the above-described embodiment and the variations thereof, each carbon dioxide recovery system is included in the flue-gas treatment system of the thermal power plant 1. However, the carbon dioxide recovery system may be included in a flue-gas treatment system of a chemical factory, a steel plant, or the like other than a thermal power plant.

In the above-described embodiment and the variations thereof, each carbon dioxide recovery system recovers carbon dioxide in exhaust gas generated at a facility (the thermal power plant 1) including the carbon dioxide recovery system. However, the carbon dioxide recovery system may recover carbon dioxide in exhaust gas at a facility different from the facility including the carbon dioxide recovery system.

In addition, forms structured by arbitrarily combining structural components of the above-described embodiment and the above-described different variations may be included within the scope of the present invention.

INDUSTRIAL APPLICABILITY

The present invention is applicable to a carbon dioxide recovery system and the like included in a flue-gas treatment system of a thermal power plant and the like.

REFERENCE SIGNS LIST 1 thermal power plant
10 power generation unit
20 control apparatus
21 temperature acquisition unit
22 temperature adjustment unit
23 storage unit
100 boiler
101 fuel supply device
102 pulverized-coal conveyance path
103 main steam pipe
104 flue
105 bottom ash treatment facility
110 denitration device
120 air preheater
121 forced draft fan
122 air entrance duct
123 air exit duct
130 smokestack
200 steam turbine
210 high-pressure turbine
220 intermediate-pressure turbine
230 low-pressure turbine
240 condenser
300 electric generator
400, 400a, 400b, 400c, 400d carbon dioxide recovery system
410 upstream-side heat exchanger
420, 422 dust collection device
421 induced draft fan
430, 431, 431a, 431b, 431c first heat exchanger
432 second heat exchanger
433 third heat exchanger
434 heat medium circulation line
434a first line
434b second line
434c bypass line
434h heater
434t heat medium tank
435 third line 436 fourth line
437, 437a steam line
440, 440a desulfurization device
441 makeup water line
442 desulfurization bypass line
450 downstream-side heat exchanger
451 boost-up fan
460 carbon dioxide recovery device
461 exhaust-gas take-out pipe
462 exhaust-gas return pipe
470 compressor
471 compressor entrance line
472, 473 compressor exit line

The invention claimed is:

1. A carbon dioxide recovery system, comprising:
a first heat exchanger that is disposed between a boiler and a desulfurization device in a flue connecting the boiler and a smokestack, configured to cool exhaust gas flowing from the boiler to the desulfurization device, and configured to heat a heat medium;
a carbon dioxide recovery device that is configured to, when supplied with heat of the heat medium, separate and recover carbon dioxide from an absorber which has absorbed the carbon dioxide;
an exhaust-gas take-out pipe that is connected to the flue and the carbon dioxide recovery device, and configured to take out the exhaust gas flowing in the flue and supply the exhaust gas from the flue to the carbon dioxide recovery device; and
an exhaust-gas return pipe that is connected to the flue and the carbon dioxide recovery device, and configured to return the exhaust gas to the flue, the exhaust gas which is returned being the exhaust gas which has been supplied to the carbon dioxide recovery device through the exhaust-gas take-out pipe and from which the carbon dioxide has been absorbed by the absorber;
a second heat exchanger that is disposed between the desulfurization device and the smokestack, configured to heat the exhaust gas flowing from the desulfurization device to the smokestack, and configured to cool the heat medium; and
a heat medium circulation line including a first line connecting an exit of the first heat exchanger for the heat medium and an entrance of the second heat exchanger for the heat medium, and a second line connecting an exit of the second heat exchanger for the heat medium and an entrance of the first heat exchanger for the heat medium,
wherein the carbon dioxide recovery device is configured to separate and recover the carbon dioxide from the absorber when supplied with the heat of the heat medium flowing through the first line.

2. The carbon dioxide recovery system according to claim 1,
wherein the first heat exchanger is disposed between the boiler and a dust collection device, and configured to cool the exhaust gas flowing from the boiler to the dust collection device.

3. The carbon dioxide recovery system according to claim 1,
wherein the carbon dioxide recovery device is connected with a third line bifurcated from the first line and configured to separate and recover the carbon dioxide from the absorber when supplied with the heat medium from the first line.

4. The carbon dioxide recovery system according to claim 1, further comprising:
a compressor that is coaxial with a turbine,
wherein the carbon dioxide recovery device is configured to separate and recover the carbon dioxide from the absorber when supplied with heat of steam discharged from the turbine and compressed by the compressor.

5. The carbon dioxide recovery system according to claim 1,
wherein the carbon dioxide recovery device is configured to, when supplied with the exhaust gas, separate and recover the carbon dioxide from the absorber through supply of the heat of the heat medium to the absorber which has absorbed the carbon dioxide in the exhaust gas.

6. The carbon dioxide recovery system according to claim 1, further comprising:
a control apparatus that is configured to adjust a temperature of the exhaust gas at an exit of the first heat exchanger so as to be in a first range, and configured to adjust a temperature of heat supplied to the carbon dioxide recovery device so as to be in a second range.

7. A carbon dioxide recovery method, comprising:
cooling exhaust gas flowing from a boiler to a desulfurization device and heating a heat medium by a first heat exchanger disposed between the boiler and the desulfurization device in a flue connecting the boiler and a smokestack; and
separating and recovering carbon dioxide from an absorber which has absorbed the carbon dioxide by supplying heat of the heat medium to a carbon dioxide recovery device,
wherein, in the separating and recovering the carbon dioxide:
the exhaust gas flowing in the flue is taken out and supplied to the carbon dioxide recovery device through an exhaust-gas take-out pipe connected to the flue and the carbon dioxide recovery device;
the exhaust gas is returned to the flue through an exhaust-gas return pipe connected to the flue and the carbon dioxide recovery device, the exhaust gas which is returned being the exhaust gas which has been supplied to the carbon dioxide recovery device through the exhaust-gas take-out pipe and from which the carbon dioxide has been absorbed by the absorber; and
the carbon dioxide from the absorber is separated and recovered by the carbon dioxide recovery device when supplied with the heat of the heat medium flowing through a first line,
wherein a heat medium circulation line includes the first line connecting an exit of the first heat exchanger for the heat medium and an entrance of a second heat exchanger for the heat medium, and a second line connecting an exit of the second heat exchanger for the heat medium and an entrance of the first heat exchanger for the heat medium.

8. A carbon dioxide recovery system, comprising:
a first heat exchanger that is disposed between a boiler and a desulfurization device in a flue connecting the boiler and a smokestack, configured to cool exhaust gas flowing from the boiler to the desulfurization device, and configured to heat a first heat medium;
a carbon dioxide recovery device that is configured to, when supplied with heat of the first heat medium, separate and recover carbon dioxide from an absorber which has absorbed the carbon dioxide;
an exhaust-gas take-out pipe that is connected to the flue and the carbon dioxide recovery device, and configured to take out the exhaust gas flowing in the flue and supply the exhaust gas from the flue to the carbon dioxide recovery device; and an exhaust-gas return pipe that is connected to the flue and the carbon dioxide recovery device, and configured to return the exhaust gas to the flue, the exhaust gas which is returned being the exhaust gas which has been supplied to the carbon dioxide recovery device through the exhaust-gas take-out pipe and from which the carbon dioxide has been absorbed by the absorber; and a second heat exchanger that is configured to cool the first heat medium heated by the first heat exchanger and heat a second heat medium, wherein the carbon dioxide recovery device is configured to separate and recover the carbon dioxide from the absorber when supplied with heat of the second heat medium.

9. The carbon dioxide recovery system according to claim 8, wherein the first heat exchanger is disposed between the boiler and a dust collection device, and configured to cool the exhaust gas flowing from the boiler to the dust collection device.

10. The carbon dioxide recovery system according to claim 8, further comprising:

a compressor that is coaxial with a turbine, wherein the second heat medium is steam discharged from the turbine and compressed by the compressor.

11. The carbon dioxide recovery system according to claim 8, wherein the carbon dioxide recovery device is configured to, when supplied with the exhaust gas, separate and recover the carbon dioxide from the absorber through supply of the heat of the first heat medium to the absorber which has absorbed the carbon dioxide in the exhaust gas.

12. The carbon dioxide recovery system according to claim 8, further comprising:

a control apparatus that is configured to adjust a temperature of the exhaust gas at an exit of the first heat exchanger so as to be in a first range, and configured to adjust a temperature of heat supplied to the carbon dioxide recovery device so as to be in a second range.

\* \* \* \* \*